May 30, 1972     D. COFFET     3,666,604

ORNAMENTAL ARTICLE AND METHOD OF MAKING THE SAME

Filed Nov. 1, 1968     2 Sheets-Sheet 1

INVENTOR
DENNIE COFFET

*Raphael Semmes*

ATTORNEY

United States Patent Office 3,666,604
Patented May 30, 1972

3,666,604
ORNAMENTAL ARTICLE AND METHOD OF
MAKING THE SAME
Dennie Coffet, 1 W. 67th St., New York, N.Y. 10023
Filed Nov. 1, 1968, Ser. No. 772,650
Int. Cl. B44b 1/06; B32b 5/24
U.S. Cl. 161—2
38 Claims

ABSTRACT OF THE DISCLOSURE

An ornamental placemat is made of top and bottom, highly polished, thermoplastic sheets between which is placed a batt of relatively opaque thermoplastic wadding. Design lines are provided by heat sealing the sheets to the wadding, which becomes compressed and fused into a transparent mass laminated to the sheets. The resulting article is relatively opaque except along the design lines which are transparent and have an unusual highly luminous appearance. The sheets and/or the wadding may be tinted to enhance the decorative quality of the article. In a second embodiment, similar effects are obtained while omitting the bottom transparent sheet. In another embodiment, the surface of the wadding is partially embedded in the transparent top sheet.

BACKGROUND OF THE INVENTION

This invention relates to ornamental articles and methods of making the same, and, in particular, to an ornamental sheet-like article which is relatively opaque except along transparent design lines.

In the prior art, it has been proposed to make ornamental sheet articles by laminating superposed layers of thermoplastic material. For example, U.S. Pat. No. 2,710,046 shows an article of this character having a design embossed in one of the superposed layers. Swiss Pat. No. 362,947 suggests that a color contrast be provided by fusing a translucent layer to a colored opaque layer.

It is also known in the prior art to provide laminated articles employing batts of thermoplastic wadding between thermoplastic sheets with the resulting product being heat sealed along pattern lines. However, articles of this character have been employed as insulating, interlining fabrics and the like.

SUMMARY OF THE INVENTION

The present invention is based upon the discovery that an assembly of a transparent thermoplasitc sheet or sheets with a layer in the form of a relatively opaque batt of thermoplastic wadding will, when heat sealed, become transparent and provide an unusual highly luminous effect.

Accordingly, it is an object of the invention to provide an improved ornamental sheet article having relatively opaque portions and relatively transparent design lines. A related object is the provision of a method for making an article of this character.

Briefly, the invention contemplates the provision of an ornamental sheet-like article having top and bottom, highly polished, transparent thermoplastic sheets between which are placed a relatively opaque batt of thermoplastic wadding. Design lines are provided by heat sealing through the outer thermoplastic sheets so that the inner thermoplastic wadding becomes fused and compressed to provide a transparent mass laminated to the outer sheets. In order to enhance the decorative effect, the outer sheets and/or the wadding may be tinted the same or different hues.

It is also contemplated in a second embodiment of the invention that the bottom transparent sheet be omitted. The wadding will then be heat sealed along the design lines to the top sheet only and will be fused and compressed to provide a transparent mass laminated to the top sheet.

In another embodiment, it is contemplated that sufficient heat and pressure be applied over the whole surface of the top sheet so that the surface of the wadding becomes partially embedded in the transparent top sheet. A greater degree of heat and pressure is applied along the embossed design lines to fuse the wadding completely and render it transparent along these lines.

The foregoing and other objects, advantages, and features of the invention and the manner in which the same are accomplished will become more readily apparent upon consideration of the following detailed description of the invention when taken in conjunction with the accompanying drawings, which illustrate a preferred and exemplary embodiment.

DETAILED DESCRIPTION OF THE PREFERRED EMBODIMENT

Figure 1:
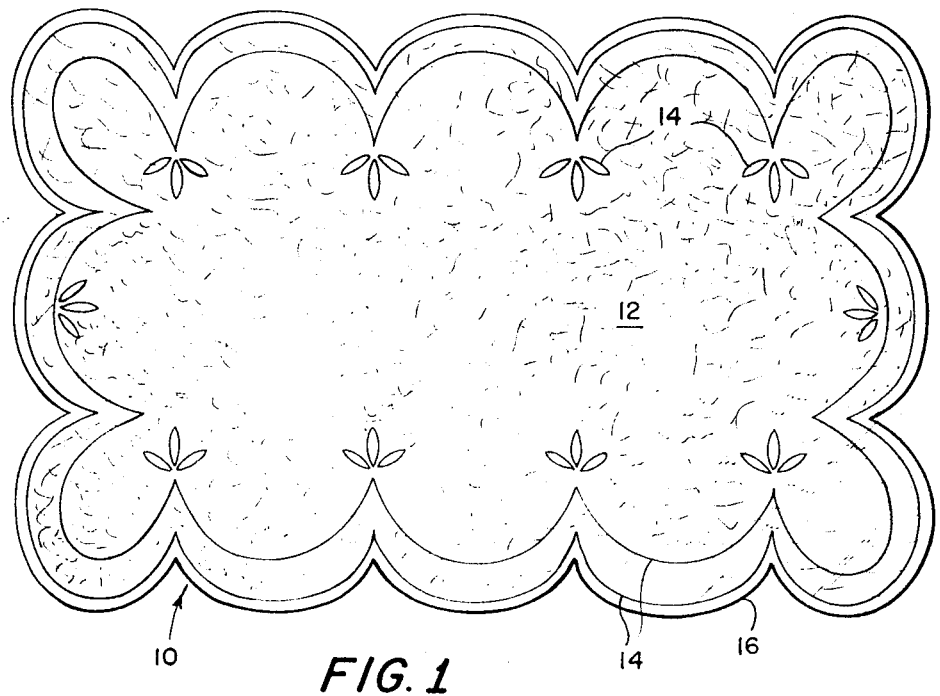
FIG. 1 is a plan view of a decorative placemat manufactured in accordance with the teachings of the invention.

Referring to FIG. 1, it will be seen that a placemat 10 manufactured in accordance with the teachings of the invention may comprise relatively opaque areas 12 upon which are placed design lines 14. As will be explained more fully hereinafter, design lines 14 are transparent and contrast with the opaque areas 12. One of the design lines 16 is provided adjacent to the outer marginal edge of mat 10 to provide a tear line for facilitating separation of the mat from the surrounding flash.

Figure 3:
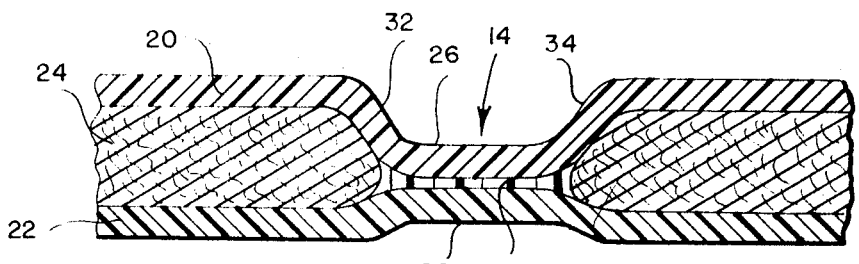
FIG. 3 is an enlarged partial section view of the placemat of FIG. 1 taken along section lines 3—3 of FIG. 2.
Figure 2:
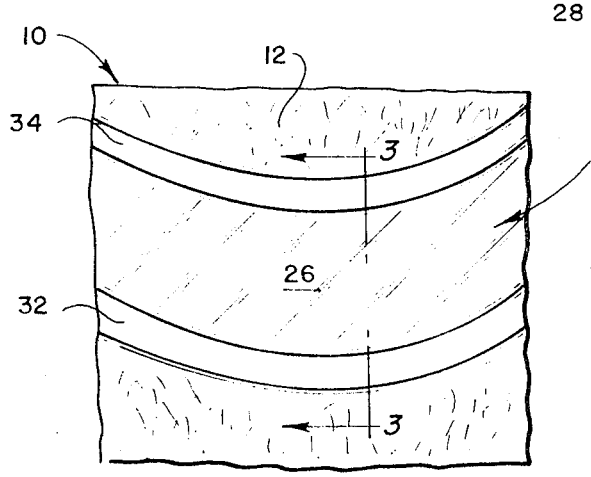
FIG. 2 is an enlarged partial plan view of the placemat of FIG. 1.

As seen most clearly from FIG. 3, the article of FIG. 1 comprises a top, highly polished, transparent, thermoplastic sheet 20 superposed over a bottom, highly polished, thermoplastic, transparent sheet 22. A thin relatively opaque batt 24 of thermoplastic wadding, which may be formed of woven or non-woven thermoplastic fibers, is provided between the sheets. The assemblage is placed in conventional heat sealing equipment, and high frequency energy is applied along design lines 14 which are embossed by an embossing die. As a result, top sheet 20 is embossed as shown at 26; bottom sheet 22 is embossed to a lesser extent at 28; and the thermoplastic wadding 24 is compressed into a fused thin region 30. Within region 30, the individual fibers of the wadding have disappeared and have become a transparent thermoplastic mass, and region 30 has become fused to sheets 20 and 22.

By virtue of the inclined side walls 32 and 34 bordering embossed portion 26 of the top sheet 20, the edges of design lines 14 have a brilliant and highly luminous appearance. This is apparently due to the highly reflective surfaces of sheet 20. In addition, when sheet 20 is tinted, the color will be more intense at 32 and 34.

One or both of the sheets 20 and 22 may be tinted, and wadding 24 may also be made of tinted fibers. Unusual effects are provided by tinting the top sheet one hue and the bottom sheet a different hue. In this way, the placemat 10 will have one color when viewed through sheet 20, and a different and contrasting color when viewed through sheet 22. Along design lines 14 the hues will be combined; but since the mat is transparent along lines 14, the color will be much less intense. However, the marginal edges of design lines 14 corresponding to inclined walls 32 and 34 will, while still transparent, be of more intense hue. In one specific example, top sheet 20 was tinted pink; bottom sheet 22 was tinted yellow; and wadding 24 was made of opaque white fibers. As a result, the mat had a pink appearance from side 20 and a yellow appearance from side 22. Design lines 14 were a very scarcely noticeable orange, but a more intense pink-orange was seen along the side edges of lines 14 when viewed from the top side. A very attractive article is also obtained by employing untinted, transparent, outer sheets in combination with a batting layer which is colored, as by spray-dyeing.

It is to be understood that while several different materials might be employed as the transparent outer sheets 20 and 22, highly successful results have been obtained with the use of highly polished, plasticized, polyvinyl chloride sheets. It is to be understood, however, that any other transparent, polished, thermoplastic sheeting may be employed which is suitable for high frequency sealing. It is important for this purpose that the material have a relatively high dielectric constant (preferably over 4 at 60 cycles). Thermoplastics which are suitable include:

polyurethanes
urethane based synthetic rubber
polystyrene
ABS (acrylonitrile-butadiene-styrene copolymer)
some acrylics and modified acrylics (modacrylics)
cellulose acetate.

The wadding 24 may be provided as a non-woven material of intertwined thermoplastic fibers. However, it is to be understood that the wadding could be made of a woven material made of such fibers. In addition, it is within the scope of the invention to employ a foam made of a suitable thermoplastic material as the wadding.

It has been found that a wadding made of non-woven acrylic fibers has been suitable and provides excellent results. It is to be understood, however, that waddings of other materials may be employed, it being essential, however, that the material completely melt through under conditions of heat sealing. "Dynel" modacrylic wadding of the type provided by Union Carbide Corporation has been found to be particularly siutable for use in articles made in accordance with the invention. A wadding of cellulose acetate as sold, for instance, by Union Wadding Company under the trade name "Unitex" might be used and will provide a rather similar effect. However, this material does not give blemish-free tearseals and usually requires a separate die cutting operation to yield a well finished edge.

It has been found that the most effective electronic heat sealing is obtained when the combined thickness of the assembly (with the wadding compressed) falls within the range of 3 mils to ¼ inch. The bulk of the wadding is not critical, but the desired design effect will usually govern its weight and bulk.

Most commercial electronic heat sealers operate over a frequency range of 25–100 megacycles per second. Depending upon the materials to be heat sealed, this range may be adjusted. For polyvinyl chloride sheets, the normally used range is 25–30 megacycles per second. However, some machines have a fixed frequency of 27.12 megacycles per second which does not interfere with local broadcasting. Machines of this character typically employ powers in the range from ¼ kilowatt up to 300 kilowatts, depending on the magnitude of the sealing area desired. As a rule of thumb, one kilowatt is necessary for sealing five square inches of sealing area.

It is to be understood that the above factors may be adjusted, together with the sealing time, in accordance with the particular materials and thicknesses employed and are adjusted to obtain optimum results. The embossing die, which acts as an electrode, can, if desired, be preheated in order to obtain special effects. Normally, the heat necessary to effect sealing is generated inside the material placed between the die—that is, between the electrode and a grounded plate—after the generation of the high frequency field. It is understood that heat is generated by the oscillation of molecules within the material.

The invention will be further illustrated in greater detail by the following specific example. It should be understood, however, that although this example describes in particular detail some of the more specific features of the invention, it is given primarily for purposes of illustration and the invention in its broader aspects is not to be construed as limited thereto.

Example

A layer of three ounce per square yard "Dynel" modacrylic wadding of the type provided by Union Carbide Corporation was placed between two, lightly tinted, highly polished, transparent, plasticized, fourteen gauge, polyvinyl chloride sheets. This assembly was placed between a grounded plate and a $\frac{1}{16}$ inch embossing die having the desired design configuration. The embossing die acted as the electrode and was coupled to a ten kilowatt high frequency generator. A field of 27.12 megacycles per second was generated for a duration of approximately three seconds with the result that the three layers were sealed together. The inner layer of thermoplastic wadding was compressed and melted into a transparent mass along the design lines and was fused to the outer sheets. The design lines were transparent and had an unusual luminous appearance. This luminous effect was enhanced along the side edges of the design lines which had a more intense color, and the design lines provided a marked contrast to the remainder of the article which was substantially opaque. Around the periphery of the placemat, the die was constructed in such a way that the finished placemat could be torn out of the selvage without any further finishing operation.

Figure 4:
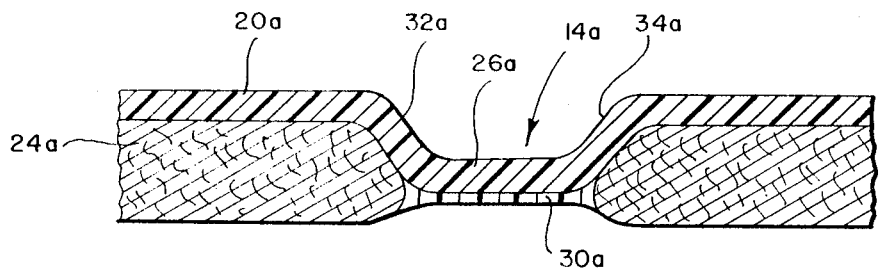
FIG. 4 is an enlarged partial section view, corresponding to FIG. 3, of a second embodiment of the invention.

Referring to FIG. 4, it will be seen that in a second emobdiment of the invention similar effects are obtained while omitting the bottom transparent sheet. A highly polished top sheet 20a is heat sealed to a thermoplastic wadding layer 24a along design lines 14a. The embossed portion 26a of the top sheet is laminated to a compressed transparent fused mass 30a formed when wadding 24a is subjected to heat and pressure along design lines 14a.

As in the embodiment of FIG. 3, the sloping walls 32a and 34a of the design lines enhance the apperance of the article. This embodiment has particular utility when it is desired to provide an article with a soft fibrous bottom surface and has been employed with great success as an ornamental tablecloth.

Figure 5:
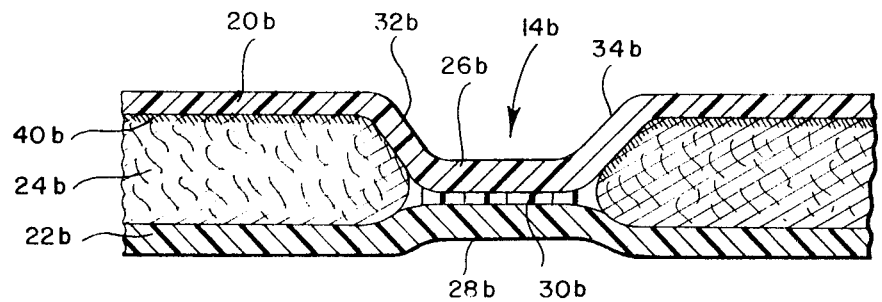
FIG. 5 is an enlarged partial section view, corresponding to FIG. 3, of another embodiment of the invention.

A generally similar, but somewhat different, effect is obtained if a part of the surface of the wadding layer, apart from the design lines, is embedded in the transparent vinyl top sheet. This is illustrated by the embodiment of FIG. 5. A surface portion 40b of thermoplastic wadding layer 24b is partially embedded in high polished transparent top sheet 20b. This may be accomplished by laminating top sheet 20b to wadding 24b by applying heat and pressure thereto without embossing the layers. Care must be exercised to insure that the heat and pressure is not sufficient to cause complete fusion of the wadding except along design lines 14b. Along these design lines, in the mannner described with reference to the embodiment of FIG. 3, the layers are embossed by an embossing die with sufficient heat and pressure being applied to cause the thermoplastic wadding layer 24b to fuse and form transparent mass 30b. The design lines 14b thus formed will have an embossed region 26b in top sheet 20b with inclined side walls 32b and 34b. The bottom, polished, transparent sheet 22b will be slightly embossed at 28b, and transparent mass 30b will be laminated between portions 26b and 28b of the top and bottom sheets.

Many different decorative and useful articles may be made in accordance with the teachings of the invention. In addition to placemats and tablecloths, as already mentioned, the invention may also be employed in the manufacture of shower curtains and wearing apparel, for example.

I claim:

1. An ornamental article comprising a bottom transparent, thermoplastic sheet, a top transparent, thermoplastic sheet, said top and bottom transparent sheets being formed of thermoplastic sheeting suitable for high frequency sealing, an intermediate layer interposed between said bottom and said top sheets, said intermediate layer comprising a relatively opaque batt of acrylic thermoplastic wadding, the combined thickness of the top sheet, bottom sheet, and intermediate layer with the wadding compressed falling within the range of 3 mils to ¼ inch, and design lines whereat said intermediate layer is heat sealed to said bottom and top sheets with said thermoplastic wadding being compressed and fused into a solid mass rendering said design lines transparent, whereby said article is transparent at said design lines and otherwise relatively opaque.

2. An ornamental article as recited in claim 1, wherein said design lines include marginal edge portions forming a border for said article.

3. An ornamental article as recited in claim 1, wherein at least one of said bottom and top sheets is tinted a particular hue.

4. An ornamental article as recited in claim 1, wherein said bottom and top sheets are tinted different hues.

5. An ornamental article as recited in claim 1, wherein said sheets are made of one thermoplastic material and said wadding is made of another thermoplastic material.

6. An ornamental article as recited in claim 1, wherein said top and bottom sheets are untinted and said wadding is tinted a particular hue.

7. An ornamental article as recited in claim 1, wherein at least one of said bottom and top sheets is embossed along said design lines.

8. An ornamental article as recited in claim 7, wherein said embossed sheet provides contrasting margins for said design lines.

9. An ornamental article as recited in claim 1, wherein said wadding comprises modacrylic wadding.

10. An ornamental article as recited in claim 9, wherein said sheets comprise polyvinyl chloride sheets.

11. An ornamental article as recited in claim 1, wherein said sheets are highly polished.

12. An ornamental article as recited in claim 11, wherein said sheets are polyvinyl chloride sheets.

13. An ornamental article as recited in claim 1, wherein said wadding comprises thermoplastic fibers.

14. An ornamental article as recited in claim 13, wherein said fibers are non-woven.

15. An ornamental article as recited in claim 13, wherein said fibers are acrylic fibers.

16. A method of making an ornamental article comprising the steps of:
providing top and bottom transparent thermoplastic sheets, said top and bottom transparent sheets being formed of thermoplastic sheeting suitable for high frequency sealing; placing a relatively opaque intermediate acrylic thermoplastic wadding layer between said sheets to form an article assembly, the combined thickness of said assembly with the wadding compressed falling within the range from 3 mils to ¼ inch, said sheets and said wadding layer being formed of materials having a relatively high dielectric constant; and heat sealing assembly along design lines to fuse and compress said wadding into a transparent mass laminated to said sheets by applying a high frequency field along said design lines.

17. A method as recited in claim 16, further comprising embossing said assembly along said design lines.

18. A method as recited in claim 16, wherein said sheets are formed of one thermoplastic material and said wadding of another thermoplastic material.

19. A method as recited in claim 16, wherein said wadding comprises non-woven acrylic fibers.

20. A method as recited in claim 16, wherein said wadding comprises modacrylic fibers.

21. A method as recited in claim 16, wherein said sheets are highly polished.

22. A method as recited in claim 21, wherein said sheets comprise polyvinyl chloride.

23. An ornamental article comprising a top transparent thermoplastic sheet formed of thermoplastic sheeting suitable for high frequency sealing, a layer comprising a relatively opaque batt of acrylic thermoplastic wadding, the combined thickness of said top sheet and said layer with the wadding compressed falling within the range from 3 mils to ¼ inch, and design lines whereat said layer is heat sealed to said top sheet with said thermoplastic wadding being compressed and fused into a solid mass rendering said design lines transparent, whereby said article is transparent at said design lines and otherwise relatively opaque.

24. An ornamental article as recited in claim 23, wherein said top sheet is embossed along said design lines.

25. An ornamental article as recited in claim 23, wherein at least one of said top sheet and layer is tinted.

26. An ornamental article as recited in claim 23, wherein said top sheet is highly polished.

27. An ornamental article as recited in claim 23, wherein a surface of said wadding, apart from said design lines, is partially embedded in said top sheet.

28. An ornamental article as recited in claim 23, wherein a surface of said wadding, apart from said design lines, is laminated to said top sheet.

29. A method of making an ornamental article comprising the steps of:
providing a top transparent thermoplastic sheet formed of thermoplastic sheeting suitable for high frequency sealing; placing a relatively opaque acrylic thermoplastic wadding layer beneath said top sheet to form an article assembly, the combined thickness of said assembly with the wadding compressed falling within the range from 3 mils to ¼ inch, said sheets and said wadding layer being formed of materials having a relatively high dielectric constant; and heat sealing said assembly along design lines to fuse and compress said wadding into a transparent mass laminated to said top sheet by applying a high frequency field along said design lines.

30. A method as recited in claim 29, further comprising embossing said assembly along said design lines.

31. A method as recited in claim 29, further comprising the step of partially embedding a surface of said wadding, apart from said design lines, in said top sheet.

32. A method as recited in claim 29, further comprising the step of laminating the surface of said wadding, apart from said design lines, to said top sheet.

33. A method as recited in claim 32, wherein said step of laminating comprises applying heat and pressure to said top sheet.

34. An ornamental article compirsing a bottom transparent polyvinyl chloride sheet, a top transparent polyvinyl chloride sheet, an intermediate layer interposed between said bottom and said top sheets, said intermediate layer comprising a relatively opaque batt of three ounce per square yard modacrylic wadding, and design lines whereat said intermediate layer is heat sealed to said bottom and top sheets with said wadding being compressed and fused into a solid mass rendering said design lines transparent, whereby said article is transparent at said design lines and otherwise relatively opaque.

35. An ornamental article as recited in claim 34, wherein said sheets are 14 gauge polyvinyl chloride sheets.

36. An ornamental article as recited in claim 34, wherein at least one of said bottom and top sheets is embossed along said design lines.

37. An ornamental article as recited in claim 34, wherein said sheets are highly polished.

38. An ornamental article comprising a bottom transparent, thermoplastic sheet, a top transparent, thermoplastic sheet, said top and bottom transparent sheets being formed of thermoplastic sheeting suitable for high frequency sealing, an intermediate layer interposed between said bottom and said top sheets, said intermediate layer comprising a relatively opaque batt of acrylic thermoplastic wadding, and design lines whereat said intermediate layer is heat sealed to said bottom and top sheets with said thermoplastic wadding being compressed and fused into a solid mass rendering said design lines transparent, whereby said article is transparent at said design lines and otherwise relatively opaque.

References Cited

UNITED STATES PATENTS

| | | | |
|---|---|---|---|
| 2,729,009 | 1/1956 | Markus et al. | 156—251 X |
| 2,958,608 | 11/1960 | Barnard | 161—146 X |
| 2,962,406 | 11/1960 | Roza | 161—146 X |
| 3,010,866 | 11/1961 | Douchet | 156—273 X |
| 3,043,733 | 7/1962 | Harmon et al. | 156—290 X |

FOREIGN PATENTS

| | | | |
|---|---|---|---|
| 362,947 | 8/1962 | Switzerland | 161—6 |
| 950,262 | 2/1964 | Great Britain | 161—2 |

WILLARD E. HOAG, Primary Examiner

U.S. Cl. X.R.

161—2, 6, 116, 150, 156, 254, 256; 156—199, 209 221, 272, 309, 324